April 19, 1960 D. RICHMAN 2,933,558

NOISE-IMMUNE SYNCHRONIZING-SIGNAL SEPARATOR
FOR TELEVISION RECEIVERS
Original Filed July 21, 1950

United States Patent Office 2,933,558

Patented Apr. 19, 1960

2,933,558

NOISE-IMMUNE SYNCHRONIZING-SIGNAL SEPARATOR FOR TELEVISION RECEIVERS

Donald Richman, Fresh Meadows, N.Y., assignor to Hazeltine Research, Inc., Chicago, Ill., a corporation of Illinois Original application July 21, 1950, Serial No. 175,192. Divided and this application December 23, 1957, Serial No. 704,663

10 Claims. (Cl. 178—7.3)

*General*

Figure 1:
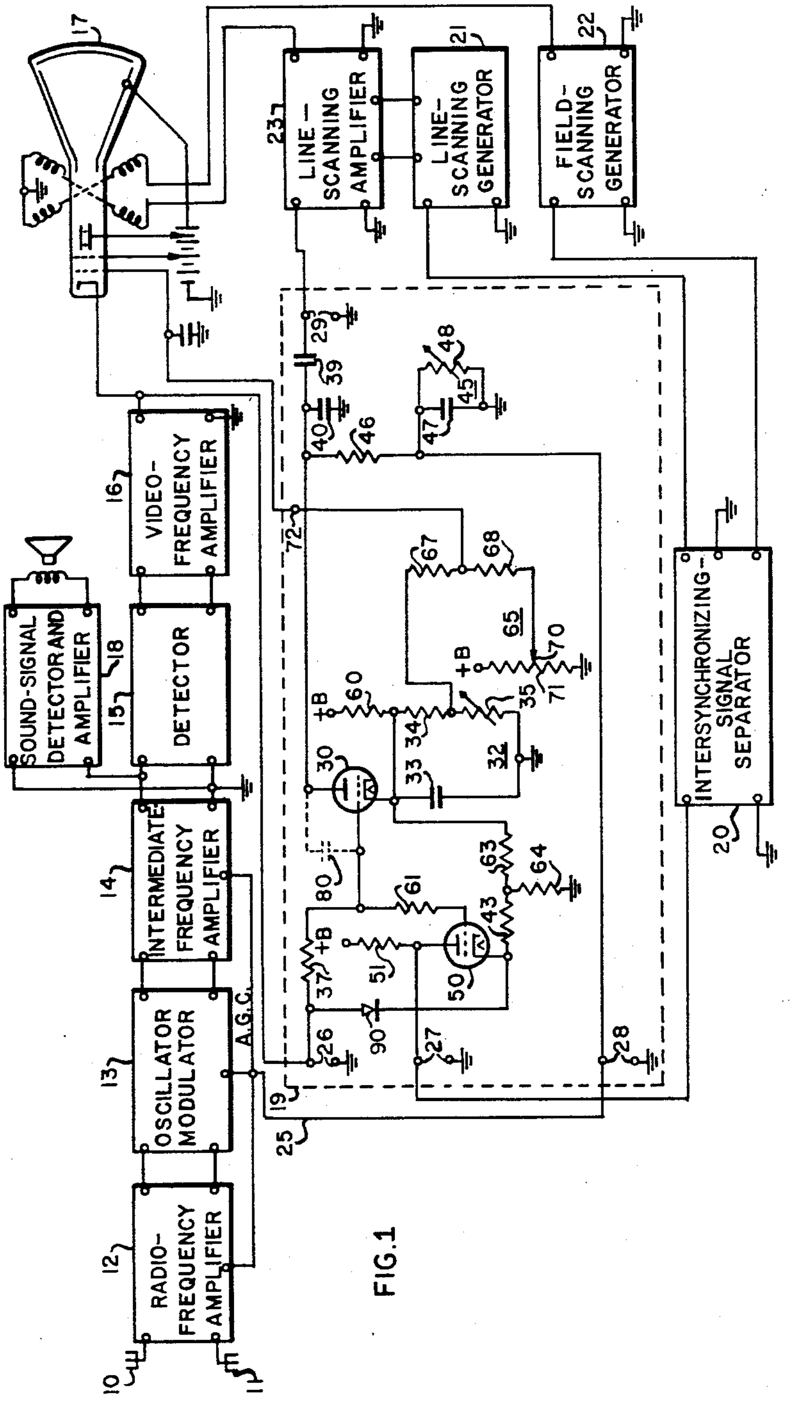

The present invention relates to control or noise-suppression apparatus for use in television receivers and is especially directed to synchronizing-signal separating apparatus having improved immunity to undesired noise present in an applied composite video-frequency signal. Although the invention is particularly suited for use as a synchronizing-signal separating apparatus, it also has utility for automatically controlling an operating characteristic of a television receiver such as the gain or amplification thereof.

This application is a division of application Serial No. 175,192, filed July 21, 1950, now abandoned.

In accordance with present television practice, there is developed and transmitted a signal which comprises a carrier wave modulated during recurrent intervals or trace periods by picture components representative of the light and shade values of an image being transmitted. During retrace intervals between the trace periods, the carrier wave is modulated by synchronizing-signal components or pulses which correspond to the initiation of successive lines and fields in the scanning of the image being televised. At the receiver, a beam is so deflected as to scan and illuminate the target of a cathode-ray image-reproducing device in a series of fields of parallel lines and the picture components of the received signal are utilized to control the intensity of the scanning beam. The line-scanning and the field-scanning components of the received signal are separated from the picture components and from each other and are utilized to synchronize the operation of the receiver line-scanning and field-scanning generators with the similar scanning apparatus utilized at the transmitter in developing the transmitted signal. The transmitted image is thereby reconstructed on the target of the receiver.

Since negative modulation of a television carrier-wave signal is standard practice in the United States, the amplitude or intensity of the received carrier-wave signal is a maximum during the occurrence of synchronizing-signal components and undesired high-amplitude noise.

Synchronizing systems of television receivers are particularly sensitive to high-amplitude noise interference which impairs the operation of the receiver scanning generators. It is highly important that the synchronization of both the line-scanning and the field-scanning generators of such a receiver be accomplished with precision in order that proper scanning may be obtained. It is particularly significant that synchronization of the line-scanning generator be extremely accurate in view of its high operating frequency and also in view of the very short duration of the synchronizing pulses applied to that generator. It is well known to those skilled in the television art that a burst of static or noise may mask a substantial number of line-synchronizing pulses or, if the static constitutes high-amplitude random noise pulses, may undesirably cause the line-scanning generator to tend to synchronize with the random pulses and thus cause faulty scanning. Since the field-frequency generator operates at a relatively low frequency and is controlled by pulses of long duration, it is less susceptible than the line-scanning generator to noise disturbances of the type under consideration. However, accurate synchronization of the last-mentioned generator is nevertheless important in a television receiver.

In view of the well-known susceptibility of the scanning systems of television receivers to noise disturbances, some such receivers have utilized synchronizing-signal separating apparatus which are substantially blocked against undesired disturbances during a portion of each operating cycle. Although synchronizing-signal separating apparatus of this type has been found to be generally satisfactory, the circuits thereof have often required the use of time-delay networks and other circuit components which render the apparatus relatively complex and, hence, more expensive to manufacture than is desirable for many applications.

It is also desirable that a television receiver include suitable apparatus for developing a control effect automatically to control an operating characteristic thereof, such as the gain or amplification. It is desirable that this gain-control effect, usually referred to as an A.G.C. effect, be determined by the intensity of the incoming signal, that is, the intensity of the carrier-wave signal, and be substantially independent of its picture-modulation components. Furthermore, it is especially desirable that the automatic-gain-control apparatus, like the synchronizing-signal separating apparatus, exhibit a high immunity to noise of the sort mentioned above. Automatic-gain-control apparatus of this type is capable of developing an automatic-gain-control effect which, in turn, is effective very accurately to maintain the signal input to the various stages of the receiver within a relatively narrow range for a wide range of received signal intensities.

An automatic-gain-control apparatus of the type just mentioned, which is keyed into operation only during the occurrence of the line-synchronizing pulses and which is effective to reject undesired interference such as noise, is disclosed and claimed in United States Letters Patent No. 2,547,648, granted April 3, 1951, and entitled "Automatic-Contrast-Control System for Television Apparatus." Such apparatus is becoming very widely employed in television receivers. Manifestly, it would be desirable to obtain from a simple synchronizing-signal separating apparatus which apparatus is relatively immune to noise not only a desired synchronizing signal but also an automatic-gain-control effect similar to that derived by apparatus in accordance with the above-identified patent. Furthermore, it is desirable that the gain-control effect be substantially unresponsive to those high-amplitude noise impulses which may be superimposed on the synchronizing-signal pulses.

It is an object of the invention, therefore, to provide for use in a television receiver a new and improved synchronizing-signal separating apparatus which avoids one or more of the disadvantages of prior such apparatus.

It is another object of the invention to provide for use in a television receiver a new and improved synchronizing-signal separating apparatus which is simple in construction, inexpensive to manufacture, and yet is capable of providing excellent rejection of interference such as high-amplitude random or impulse noise.

It is yet another object of the present invention to provide for use in a television receiver a control apparatus which is effective to derive substantially noise-free synchronizing signals having an amplitude relatively independent of amplitude variations of the applied composite video-frequency signal and which is also effective simultaneously to derive an automatic-gain-control effect having a value proportional to the amplitude of the received carrier-wave signal but substantially unaffected by noise.

For a better understanding of the present invention, together with other and further objects thereof, reference is had to the following description taken in connection with the accompanying drawing, and its scope will be pointed out in the appended claims.

The accompanying drawing, Fig. 1, is a circuit diagram, partly schematic, of a complete television receiver including an automatic-control apparatus in accordance with a particular form of the invention.

*General description of Fig. 1 receiver*

Referring now more particularly to Fig. 1 of the drawing, the television receiver there represented comprises a receiver of the superheterodyne type including an antenna system 10, 11 coupled to a radio-frequency amplifier 12 of one or more stages. There are coupled to the latter unit in cascade, in the order named, an oscillator-modulator 13, an intermediate-frequency amplifier 14 of one or more stages, a detector 15, a direct-current video-frequency amplifier 16 of one or more stages, and a cathode-ray image-reproducing device 17 of conventional construction provided with the usual line-frequency and field-frequency scanning coils for deflecting the cathode-ray beam in two directions normal to each other. Connected to the output terminals of the intermediate-frequency amplifier 14 is a conventional sound-signal detector and amplifier 18 which comprises the usual frequency detector, amplifiers, and sound-reproducing device.

An output circuit of the video-frequency amplifier 16 is coupled to an input circuit including input terminals 26, 26 of a control apparatus 19, and an output circuit of the latter, including output terminals 27, 27, is coupled to a line-scanning generator 21 and a field-scanning generator 22 through an intersynchronizing-signal separator 20. The output circuit of the generator 21 is coupled in a conventional manner to the line-scanning coil of the image-reproducing device 17 through a line-scanning amplifier 23 while the field-scanning generator 22, which may include suitable amplifiers, is connected to the field-scanning coil of the image-reproducing device. An output circuit of the line-scanning amplifier 23 is connected to input terminals 29, 29 of the control apparatus 19. Output terminals 28, 28 of the control apparatus 19 are connected to the input circuits of one or more of the stages of the units 12, 13, and 14 by a control circuit conductor 25 to supply an automatic-gain-control or A.G.C. effect to those stages. The units 10–23, inclusive, with the exception of the apparatus 19 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector 15. The modulation components of the signal are derived by the detector 15 and are applied to the direct-current video-frequency amplifier 16 wherein those components including the original unidirectional components are amplified and from which they are supplied to the input circuit of the image-reproducing device 17.

A control voltage, which is derived in a manner to be explained in detail subsequently by an automatic-gain-control supply in the unit 19, is applied by the control circuit conductor 25 as an automatic-amplificaion-control bias to the gain-control circuits of units 12, 13, and 14 to maintain the signal input within a relatively narrow range for a wide range of received signal intensities. The unit 19 also selects the synchronizing signals from the other modulation components of the composite video-frequency signal applied thereto by the video-frequency amplifier 16.

The line-synchronizing and field-synchronizing signals derived by the unit 19 are applied by the terminals 27, 27 to the intersynchronizing-signal separator 20 wherein the are separated from each other and are then supplied to individual ones of the generators 21 and 22 to synchronize the operation thereof. An electron beam is produced by the cathode-ray image-reproducing device 17 and the intensity of this beam is controlled in accordance with the video frequency and control voltages impressed on the brilliancy-control electrode thereof. Saw-tooth-current waves are generated in the line-frequency and field-frequency generators 21 and 22, respectively. The output signal of the generator 21 is supplied to the line-scanning coil of unit 17 through the amplifier 23 while the output signal of generator 22 is supplied directly to the field-scanning coil of device 17 to produce the usual scanning fields, thereby to deflect the cathode-ray beam of device 17 in two directions normal to each other to trace a rectilinear scanning pattern on the screen of the tube and thereby reconstruct the translated picture.

The audio-frequency modulation components of the received signal are derived in a conventional manner by the sound-signal detector and amplifier 18 and are applied to the loudspeaker thereof and converted to sound.

*Description of control apparatus of Fig. 1*

Referring now more particularly to Fig. 1 of the drawing, the automatic-control apparatus 19 for the television receiver includes an electron-discharge means such as a triode 30 which is so arranged as to have at least two operating conditions which are more fully to be described hereinafter. The apparatus 19 includes an impedance or integrating network 32 which has a relatively high impedance and is connected between the cathode of the triode and a fixed reference potential point such as ground and hence appears in series relation with the space-current path of the tube. This network comprises an energy-storage device in the form of a condenser 33 which is connected in parallel with a pair of series-connected resistors 34 and 35. The resistor 35 is adjustable for controlling the magnitude of the cathode bias of the tube 30 and the contrast of the image reproduced by image-reproducing device 17 of the television receiver in a manner which will be described subsequently. A source of unidirectional potential indicated as +B is connected to the cathode of the tube 30 through a voltage divider including a resistor 60 and the resistors 34 and 35 for developing a suitable bias on the cathode of the tube. The network 32 preferably has a time constant which is at least several times the period of the line-synchronizing signal components applied to the input terminals 26, 26 of unit 19.

The apparatus 19 further includes a supply circuit comprising means coupled to the input electrodes of the tube 30 including the control electrode thereof for applying thereto the video-frequency signal derived by the detector 15, the amplitude of which signal may vary and which effectively includes picture components, black-level pedestals, at least one type of synchronizing-signal components, namely the line-synchronizing signal components, and the original unidirectional or direct-current components representative of light variations and which may include undesired random pulses at least some of which may have an amplitude greater than the amplitude of the synchronizing-signal components. The line-synchronizing signal components are more positive than the picture components and tend to convert the tube 30 from one of its operating conditions to another. The means just mentioned comprises the input terminals 26, 26 which are connected to the input circuit of the video-frequency amplifier 16 and also comprises a current-limiting resistor 37 connected between one of the terminals and the control electrode of tube 30.

The apparatus also includes a source of a control signal having an amplitude substantially unaffected by amplitude variations of the synchronizing-signal components derived by the receiver for supplying the aforesaid control signal to one of the electrodes of the tube 30, specifically to the anode thereof, in synchronous relation with the application of the line-synchronizing signal components to the control electrode and with such polarity as to convert the tube from one operating condition to another substantially only during the intervals of the line-synchronizing signal components, thereby to develop across the network 32, in a manner to be explained subsequently, a control effect related to the peak amplitude of the line-synchronizing signal components but substantially independent of the accompanying undesired random pulses. This control-signal source comprises an input circuit including the input terminals 29, 29 which are coupled to an output circuit by the line-scanning amplifier 23 and to the tube 30 through a coupling condenser 39. A condenser 40 is connected between the anode of the tube 30 and ground and effectively constitutes the input impedance of that circuit. The high-potential one of the terminals 29, 29 is preferably coupled to a suitable point in the line-scanning amplifier 23 such as the anode of the amplifier tube where there is coupled, in a conventional manner during each line-retrace interval, a relatively high-amplitude, short-duration impulse of positive polarity due to the collapsing magnetic field in the circuits associated with the line-scanning coil of the image-reproducing device 17. The well-known characteristics, such as the Q of the tuned circuits of the generator 21 and its amplifier 23, are such that the positive output pulse applied to the terminals 29, 29 has an amplitude which is substantially unaffected by amplitude variations or temporary loss of the synchronizing-signal components applied to the terminals 26, 26 of unit 19 from the video-frequency amplifier 16.

In accordance with a feature of the invention fully described and explained in Patent No. 2,784,249, granted March 5, 1957, and entitled "Keyed Automatic Gain Control," a condenser 80 which is represented in broken-line construction since it may be comprised in whole or in part of the anode control-electrode capacitance of the tube 30 and the inherent capacitance of the connections to those electrodes, is connected between the anode and the cathode of the tube.

The control apparatus 19 additionally includes a parallel-connected resistor 48 and condenser 47 forming a second impedance network 45 which, like the network 32, has developed thereacross a control potential having a value proportional to the cathode current of the tube 30 and related to the peak amplitudes of the line-synchronizing signal components but substantially independent of the undesired random pulses. One terminal of the network 45 is coupled to the anode of the tube 30 through a resistor 46 while the other terminal thereof is connected to a point of fixed reference potential such as ground. The network 45 and the resistor 46 constitute a direct-current path between the anode of the tube 30 and ground. The junction of the network 45 and the resistor 46 is connected to the automatic-gain-control output terminals 28, 28 of the unit 19. The network 45 is preferably proportioned to have a time constant at least several times the interval between the line-synchronizing pulses. The operating potentials developed and applied to the tube 30, in particular that developed across the network 32, are such that it is normally nonconductive.

The unit 19 also includes a utilization circuit or synchronizing-signal stripper means including an electron-discharge device coupled to the applying means comprising the high-potential one of the terminals 26, 26 and to the network 32 and responsive to at least some of the various components of the applied video-frequency signal for deriving synchronizing-signal components which are substantially independent of the undesired random pulses and which have amplitudes substantially independent of any amplitude variations of the video-frequency signals applied to the terminals 26, 26. This device comprises a rectifier device in the form of a triode 50. The control electrodes of the tubes 30 and 50 are interconnected through a resistor 61 and the anode of the tube 50 is connected to a source of potential +B through a load resistor 51 and is also connected to the high-potential one of the output terminals 27, 27. A positive bias potential, which is effective normally to maintain the tube 50 in a nonconductive condition, is applied to the cathode of that tube through a resistor 43 which has one terminal thereof connected to the junction of resistors 63 and 64 which are connected in series between the cathode of the tube 30 and ground. The resistors 63 and 64 preferably have a resistance which is much greater than that of either of the resistors 34 or 35.

The apparatus 19 additionally includes a resistive impedance network 65 which is coupled to the network 32 and is responsive to the control potential developed in network 32, this impedance network 65 having parameters so proportioned as to develop between the high-potential or ungrounded one of the terminals 26, 26 and a predetermined portion of the network 65 a unidirectional potential having an amplitude less than that of the pedestals of the modulation signal applied to the terminals 26, 26 and which varies in a manner approximately directly proportional to variations in the amplitude of the predetermined shade or black-level pedestals or of the synchronizing-signal components but which is substantially independent of the aforesaid undesired random pulses. The impedance network 65 comprises a potential divider including a pair of series-connected resistors 67 and 68 connected across resistor 35 through an adjustable tap 70 of a voltage divider 71 connected to a source indicated +B, this divider serving to control background intensity or brightness of the image produced by the image-reproducing device 17 of the receiver. The junction of the resistors 67 and 68 is connected to an output terminal 72 which is, in turn, connected to the control electrode of the image-reproducing device 17. Each of the resistors 67 and 68 has a value of resistance much greater than that of the contrast control 35 and also greater than that of the resistor 71, particularly that portion of the latter between the tap 70 and ground. The details of the proportioning of the impedance network 65 are more fully explained in connection with Fig. 1 of Patent 2,673,892, granted March 30, 1954, and entitled "Automatic-Control Apparatus for Television Receiver."

The apparatus 19 further includes a control circuit including a circuit element in the form of a rectifier device 90 coupled between the applying means, or the high-potential one of the terminals 26, 26, and the impedance network 32 and having a threshold response and, above the threshold, being effectively responsive jointly to the control potential developed across the network 32 and to those random pulses having an amplitude greater than the amplitude of the synchronizing-signal components for deriving a control effect of recurrent pulse wave form, individual pulses of which have an amplitude related to the amplitude difference between the last-mentioned random pulses and the peak amplitude of the line-synchronizing signal components. The device 90, which may be of the contact or the thermionic type, is connected with such polarity that it is effective to conduct upon the application to the terminals 26, 26 of positive-going noise pulses having an amplitude greater than that of the line-synchronizing signal pulses.

The anode of the device 90 is connected directly to the high-potential one of the terminals 26, 26 and the cathode thereof is connected directly to the cathode of the tube 50. Thus, the cathode of the device 90 is coupled to the impedance network 32 through the resistor network 43, 64, 63. As will be made clear hereinafter, the tube 50 of the synchronizing-signal separator comprises a means for utilizing the control effect developed by the rectifier device 90.

*Operation of Fig. 1 control apparatus*

In considering the operation of the apparatus 19, it will be assumed initially that the proper operating bias has been established across the network 32 by adjustment of the resistor 35 and also by the biases established across the networks 45 and 32 by a few cycles of operation of the apparatus. As previously mentioned, it will also be assumed that the tube 30 is normally nonconductive and is effective to conduct only during the occurrence of the line-synchronizing pulses. It will be further assumed that the position on the resistor 71 of the tap 70 controlling the brightness of the image reproduced by the device 17 and also that the adjustment of the contrast control 35 cause the device 17 to produce a proper image. As hereinbefore mentioned, the composite video-frequency signal including the usual picture components, the line-synchronizing and field-synchronizing components, and the unidirectional components is supplied by the output circuit of the direct-current video-frequency amplifier 16 to the terminals 26, 26 coupled to the control electrode-cathode input circuit of the tube 30. There is also applied to the anode-cathode circuit of that tube by way of the terminals 29, 29 and the coupling condenser 39 a control signal comprising periodic positive polarity gating pulses supplied by the line-scanning amplifier 23. These periodic pulses, which constitute the sole anode energizing potential for the tube 30, are applied to the anode thereof in synchronous relation with, in particular coincident with, the application of the line-synchronizing pulses periodically and momentarily to render the tube 30 conductive, thereby to develop across the network 32, or a portion thereof such as across resistor 35, a unidirectional control potential of positive polarity dynamically related to the peak amplitude of the line-synchronizing components. Specifically, the developed potential is proportional to the amplitude of those components and is positive at the cathode of the tube 30. A potential, having a value related to the aforesaid cathode potential but having a negative polarity at the junction of the resistors 46 and 48, is developed across the network 45 since the networks 32 and 45 are both in the same direct-current anode-cathode loop or circuit of the tube 30. The potential developed across the last-mentioned network for application to the output terminals 28, 28 is related to the average direct current drawn from the anode excitation source comprising the terminals 29, 29 and this potential, as will be made clear subsequently, constitutes an automatic-gain-control potential related to the peak value of the composite video-frequency signal applied to the terminals 26, 26. Hence, the potential just mentioned is proportional to the effective amplitude of the carrier component of the television signal intercepted by the antenna system 10, 11 of the receiver and is most effective for its designated purpose.

Considering further the action of the circuit 19 on the signals applied to the terminals 26, 26 and 29, 29, the resistor 37 coupled between one of the terminals 26, 26 and the control electrode of the tube 30 is effective to produce some positive clipping of any noise pulses having an amplitude equal to or greater than the synchronizing pulses. The conjoint action on the tube 30 of the gating pulses and the line-synchronizing pulses is to establish a variable direct-current reference level or positive potential at the cathode of the tube 30, that is, across the network 32. This level is determined by the amplitude of the line-synchronizing pulses. Thus, should the amplitude of the video-frequency signal and, hence, the line-synchronizing pulses, decrease in amplitude for any reason such as atmospheric disturbances or fading which affects the received wave-signal intensity, the bias developed across the network decreases proportionally so that the average amplitude of the potential between the control electrode and the cathode of the tube 30 remains at a level which bears a substantially fixed relationship to the level corresponding to the level of the synchronizing-signal peaks applied to the control electrode of tube 30. Conversely, when the amplitude of the synchronizing-signal pulses increases, the potential appearing across the network 32 increases in proportion to the aforesaid amplitude increase. Consequently, the reference level or potential established at the cathode of the tube 30, or the potential across a portion of the network 32, varies in accordance with the peak amplitudes of the components of the signal applied to the terminals 26, 26. This, in turn, keeps the average amplitude of the potential between the control electrode and the cathode at a level which bears a substantially fixed relationship to the level corresponding to the level of the synchronizing-signal peaks applied to the control electrode of tube 30.

Potential changes corresponding to those appearing across the network 32 but of opposite polarity thereto are developed across the network 45. Since the time constant of the network 45 is long with reference to the interval between line-synchronizing pulses, an average potential related to the peak amplitude of the line-synchronizing signal components and, hence, the carrier amplitude, is developed across that network and constitutes an accurate desirable automatic-gain-control potential.

Considering the circuit of the tube 30 from a somewhat different standpoint, the circuit may be regarded for direct-current conditions as being in the nature of a cathode-follower amplifier wherein the potential of the cathode follows that of the control electrode. Thus, the average potential of the cathode of the tube 30 bears a fixed relationship to the instantaneous potential appearing on the control electrode of that tube during the occurrence of a synchronizing-signal pulse. Expressed somewhat differently, the composite video-frequency signal applied to the control electrode-cathode circuit of the tube 30 effectively acts in series wtih the variable direct-current reference level established at the cathode of the tube or across a selected portion of the network 32. Thus, the circuit of the tube 30 may be considered to constitute a clamping circuit which is effective to clamp the cathode or a selected point on the network 32 such as the junction of the resistors 34 and 35 to a varying reference level. The significance of this feature will be made clear presently.

The resistor network 63, 64, 43 is effective to supply a suitable positive bias to the cathode of the tube 50, thus effectively determining the magnitude of the signal required for application between the control electrode and the cathode of the tube 50 to render it conductive. Since the tube 50 performs a clipping function, the bias just mentioned is selected by suitable proportioning of the resistors 60, 63, and 64 and the selection of the potential +B so that the clipping level is above the maximum amplitude level of the picture-signal components of the composite video-frequency signal. When the tube 50 is rendered conductive, there is developed at its anode and hence between the terminals 27, 27 only synchronizing-signal components having approximately constant amplitudes for application to the intersynchronizing-signal separator 20.

In addition to supplying a synchronizing-signal output signal having an approximately constant amplitude, unit 19 has a low susceptibility to undesired random pulses or noise, in particular to noise occurring during the intervals between applied line-synchronizing pulses. Since short-duration positive pulses are applied to the input terminals 29, 29 of the unit 19 from the line-scanning amplifier 23 to gate or key the tube 30, the anode-cathode path through the tube is conductive only for a very small percentage of the time and the resistor 37 so limits the current that can flow from the control electrode to the cathode due to strong noise pulses that the average value of this control-electrode current is normally small in comparison with that of the anode current. Accordingly, random or noise impulses occurring between synchronizing pulses have an inappreciable effect on the operation of the tube 30 and also on the variable bias potentials developed across the networks 32 and 45. Consequently, the automatic-gain-control portion of the unit 19 constitutes a so-called "keyed automatic-gain-control system" which is characterized by its excellent noise immunity. Noise impulses having an amplitude greater than the desired synchronizing pulses are reduced by grid-current limiting in the circuit including the resistor 37 and, due to the periodic conductivity of the tube 30 at the line-synchronizing signal rate, the reference level developed at the junction of the resistor 34 and the condenser 33 is not appreciably affected by high-amplitude noise appearing in the signal applied to the terminals 26, 26 of the unit 19.

It has been previously stated that the potential developed at the cathode of the tube 30 is related to the tips of the synchronizing pulses. Since the cathodes of the tubes 30 and 50 are interconnected through a resistor network, the potential variations at the cathode of the tube 50 are related to those at the cathode of the tube 30. Random noise pulses which have an amplitude that exceeds the threshold established at the cathode of tube 50 are effective to render the rectifier device 90 conductive, thus developing a potential across the load resistors 43 and 64. The device 90 is thus differentially actuated by the noise pulses and the unidirectional potential developed at the cathodes of devices 90 and 50. Accordingly, there is developed at the cathode of the tube 50 from the aforesaid random noise pulses a relatively large control effect of recurrent pulse wave form, individual pulses thereof having a positive amplitude related to the amplitude difference between those random pulses which exceed the peak amplitude of the synchronizing pulses and a direct-current potential derived from those synchronizing pulses. These recurring positive polarity pulses are effective during the occurrence thereof to bias or to maintain the tube 50 at anode-current cutoff, thus materially reducing or effectively minimizing the translation of random noise pulses to the output circuit of the tube 50 and, hence, to the terminals 27, 27. Due to finite bandwidth limitations of the circuits associated with the tubes 30 and 50, short spikes corresponding to the leading and the trailing edges of the random noise pulses may be translated from the terminals 26, 26 through the aforesaid tubes to the synchronizing-signal output terminals 27, 27. Due to stray circuit capacitance, however, these spikes are materially reduced in amplitude to a value much lower than that of the original noise pulses.

From the foregoing description and explanation it will be seen that the circuits of the tube 50 and the rectifier device 90 comprise a synchronizing-signal translating system including an input circuit (the input circuit of the tube 50) coupled between the applying means comprising the ungrounded one of the terminals 26, 26 and the network 32 and responsive to the control potential developed in the network 32 and to the modulation signal and also including an output circuit (comprising the output circuit of the tube 50), the circuit elements of this translating system being arranged to develop a control effect in the input circuit (namely, the periodic potential pulses applied to the cathode of tube 50) from the random pulses having an amplitude greater than that of the synchronizing pulses, whereby the system translates to its output circuit synchronizing-signal components substantially independent of the undesired random pulses.

The condenser 80 and the primarily resistive impedance of the control electrode-cathode input circuit of the tube 30 comprise a differentiating means which is effective to render the potential developed across the networks 32 and 45 substantially unresponsive to relative phase variations between the signal applied to the anode of the tube 30 and the signal applied to the control electrode of that tube in a manner fully explained in Patent No. 2,784,249.

In the manner fully explained in Patent No. 2,673,892, the network 65 develops for application to the control electrode of the image-reproducing device 17 a potential which varies in accordance with the pedestals or black level of the composite video-frequency signal applied to the acthode-ray device, thus assuring that the device 17 reproduces all picture components with the correct shade so that light gradations from black to white are properly reproduced in the reproduced image.

While applicant does not intend to limit the invention to any specific circuit constants, the following constants are given as illustrative of one embodiment of the invention constructed in accordance with the apparatus of Fig. 1:

| | |
|---|---|
| Resistors **34** and **46** | 150 kilohms. |
| Resistor **35** | 250 kilohms (max.). |
| Resistor **37** | 10 kilohms. |
| Resistor **43** | 47 kilohms. |
| Resistor **48** | 100 kilohms (max.). |
| Resistor **51** | 220 kilohms. |
| Resistor **60** | 390 kilohms. |
| Resistor **61** | 22 kilohms. |
| Resistor **63** | 15 kilohms. |
| Resistor **64** | 390 kilohms. |
| Resistor **67** | 1.5 megohms. |
| Resistor **68** | 2.2 megohms. |
| Resistor **70** | 320 kilohms (max.). |
| Condenser **33** | 0.22 microfarad. |
| Condenser **40** | 68 micromicrofarads. |
| Condenser **47** | 0.22 microfarad. |
| Condenser **80** | About 3 micromicrofarads. |
| +B | 250 volts. |
| Tubes **30** and **50** | Type 12AU7. |
| Rectifier device **90** | Type IN34A germanium crystal. |
| Periodic potential applied to terminals **26, 26** | About 45 volts peak-to-peak. |
| Peak periodic potential applied to anode of tube **30** | About 350 volts. |
| Duration of potential applied to anode of tube **30** | About 7½ microseconds. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A highly noise-immune synchronizing-signal separator system for a television receiver comprising: first means for supplying a negatively modulated television signal including picture-signal components and synchronizing pulses which tend to be accompanied by unwanted noise signals greater in amplitude than the synchronizing pulses; second means coupled to said first means for developing a potential representative of and which varies dynamically with the amplitude of said synchronizing pulses; synchronizing-signal separating means responsive to said first means and dynamically responsive to said potential for separating said synchronizing pulses above the maximum level of said picture-signal components regardless of variations in the amplitude of said synchronizing pulses; and means coupled to said first and second means for rendering said separating means inoperative in response to the occurence of said noise signals.

2. A highly noise-immune synchronizing-signal separator system for a television receiver comprising: first means for supplying a negatively modulated television signal including picture-signal components and synchronizing pulses which tend to be accompanied by unwanted noise signals greater in amplitude than the synchronizing pulses; second means coupled to said first means for developing a potential representative of and which varies dynamically with the amplitude of said synchronizing pulses; synchronizing-signal separating means responsive to said first means and dynamically responsive to said potential for separating said synchronizing pulses above the maximum level of said picture-signal components regardless of variations in the amplitude of said synchronizing pulses; means coupled to said first and second means for rendering said separating means inoperative in response to the occurrence of said noise signals; and means responsive to said second means for maintaining the amplitude of said synchronizing pulses within a relatively narrow range for a wide range of intensities of said television signal.

3. A noise-suppression apparatus for a television receiver including a supply circuit for a composite video-frequency signal including a direct-current component and picture components interspersed with synchronizing-signal components and subject to random noise pulses having amplitudes substantially greater than said synchronizing-signal components comprising: means coupled to said supply circuit, responsive to said signal, and having a point therein for developing at said point a unidirectional potential which is representative of and varies dynamically with the amplitude of a series of said synchronizing-signal components; a circuit element coupled to said supply circuit and said point and having a threshold response and, above the threshold, responsive jointly to said noise pulses and said unidirectional potential for developing output pulses therefrom; a synchronizing-signal stripper responsive to at least some of said components of said video-frequency signal and undesirably responsive to said noise pulses for deriving said synchronizing-signal components; and means for impressing said output pulses on said stripper in opposition to said noise pulses effectively to suppress the latter.

4. In a television receiver, a synchronizing-signal separating aparatus comprising: a synchronously controlled rectifier system, a circuit for applying to said system a composite video-frequency signal including the direct-current component, synchronizing-signal components, and random noise pulses having an amplitude exceeding the peak amplitude of said synchronizing components, and means including a gating circuit for applying to said system control pulses coincident with said synchronizing components to derive during said coincidence said unidirectional potential which is representative of and varies dynamically with the peak amplitudes of said synchronizing components; synchronizing-signal stripper means responsive to at least some of said components of said video-frequency signal and undesirably responsive to said noise pulses for deriving said synchronizing-signal components; a circuit element coupled to said system and having a threshold response and, above the threshold, responsive jointly to said noise pulses and said unidirectional potential for developing output pulses therefrom; and means for impressing said output pulses on said stripper means in opposition to said noise pulses effectively to suppress the latter.

5. In a television receiver, a synchronizing-signal separating apparatus comprising: a synchronously controlled rectifier system, a circuit for applying to said system a composite video-frequency signal including the direct-current component, synchronizing-signal components, and random noise pulses having an amplitude exceeding the peak amplitude of said synchronizing components, and means including a gating circuit for applying to said system control pulses coincident with said synchronizing components, for deriving during said coincidence said unidirectional potential which is representative of and varies dynamically with the peak amplitudes of said synchronizing components; a resistor connected in series relation in said first-mentioned circuit and responsive to current through said rectifier device produced by said noise pulses for limiting the magnitude thereof; synchronizing-signal stripper means responsive to at least some of said components of said video-frequency signal and undesirably responsive to said noise pulses for deriving said synchronizing-signal components; a circuit element coupled to said system and having a threshold response and, above the threshold, responsive jointly to said noise pulses and said unidirectional potential for developing output pulses therefrom; and means for impressing said output pulses on said stripepr means in opposition to said noise pulses effectively to suppress the latter.

6. In a television receiver, a synchronizing-signal separating apparatus comprising: a synchronously controlled rectifier system, including a first rectifier device having a cathode, a circuit for applying to said device a composite modulation signal including the original unidirectional component, line-synchronizing signal pulses, and random noise pulses having an amplitude exceeding the peak amplitude of said synchronizing pulses, an impedance network connected as a cathode load for said device and including a point thereon remote from said cathode maintained at a fixed reference potential and having a time constant at least several times the period of said line-synchronizing pulses and dynamically responsive to the cathode current of said device for deriving a control potential normally maintaining said device in a nonconductive condition, and means including a gating circuit for applying to said device control pulses in coincident relation with said synchronizing pulses and with such polarity in relation thereto as to derive across said network during said coincidence said control potential representative of and varying dynamically with the peak amplitudes of said synchronizing pulses; synchronizing-signal stripper means coupled to said network and responsive to said control potential and said composite signal for deriving therefrom line-synchronizing pulses which may include at least some of said random pulses; and means including a second rectifier device having an anode coupled to said first-mentioned circuit and a cathode coupled to said impedance network and responsive jointly to said noise pulses and said control potential for deriving and applying to said stripper means output pulses in opposition to said noise pulses, whereby the derived line-synchronizing pulses are substantially free from said random pulses.

7. In a television receiver, a synchronizing-signal separating apparatus comprising: a synchronously controlled rectifier system, including a first rectifier device having a cathode, a circuit for applying to said device a composite modulation signal including the original unidirectional component, synchronizing-signal pulses, and random noise pulses having an amplitude exceeding the peak amplitude of said synchronizing pulses, an impedance network connected as a cathode load for said device, including a point thereon remote from said cathode maintained at a fixed reference potential, having a time constant at least several times the period of said synchronizing pulses, and dynamically responsive to the cathode current of said device for deriving a control potential normally maintaining said device in a nonconductive condition, and means including a gating circuit for applying to said device control pulses in coincident relation with said synchronizing pulses and with such polarity in relation thereto as to derive during said coincidence said control potential which is representative of and varies dynamically with the peak amplitudes of said synchronizing pulses; synchronizing-signal stripper means including an electron-discharge device having an input circuit and an output circuit, said input circuit being coupled to said applying circuit and said network and responsive to said control potential and said composite signal for deriving therefrom in said output circuit synchronizing pulses which may include at least some of said random pulses; and means including a second rectifier device coupled to said applying circuit and said network and responsive jointly to said noise pulses and said control potential for deriving and applying to said stripper means output pulses in opposition to said noise pulses, whereby the derived synchronizing pulses are substantially free from said random pulses.

8. In a television receiver, a synchronizing-signal separating apparatus comprising: a synchronously controlled rectifier system, including a first rectifier device having a cathode, a circuit for applying to said device a composite modulation signal including the original unidirectional component, synchronizing-signal pulses, and random noise pulses having an amplitude exceeding the peak amplitude of said synchronizing pulses, an impedance network connected as a cathode load for said device, including a point thereon remote from said cathode maintained at a fixed reference potential, having a time constant at least several times the period of said synchronizing pulses, and dynamically responsive to the cathode current of said device for deriving a control potential normally maintaining said device in a nonconductive condition, and means including a gating circuit for applying to said device control pulses in coincident relation with said synchronizing pulses, and with such polarity in relation thereto as to derive during said coincidence said control potential which is representative of and varies dynamically with the peak amplitudes of said synchronizing pulses; synchronizing-signal stripper means including a triode having an input circuit and an output circuit, said input circuit being coupled to said applying circuit and said network and responsive to said control potential and said composite signal for deriving therefrom in said output circuit synchronizing pulses which may include at least some of said random pulses; and means including a second rectifier device coupled to said applying circuit and said network and responsive jointly to said noise pulses and said control potential for deriving and applying to said stripper means output pulses in opposition to said noise pulses, whereby the derived synchronizing pulses are substantially free from said random pulses.

9. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional component, and undesired random noise pulses and synchronizing-signal pulses having such polarity as to tend to render said means conductive; an impedance network, connected as a cathode load for said means and including a point thereon remote from said cathode maintained at a fixed reference potential, having a time constant at least several times the period of said synchronizing pulses and responsive to electron discharges between said output electrodes for deriving a control potential normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control potential having a value related to the peak amplitude of said synchronizing pulses but substantially independent of said undesired noise pulses; a synchronizing-signal stripper including an electron-discharge device coupled to said applying circuit and to said network at a point other than said fixed reference point, said device having a load impedance and being so poled as normally to be maintained in a nonconductive condition by said control potential but to be rendered conductive by said synchronizing pulses for deriving across said load impedance synchronizing pulses and said noise pulses; and an electron-discharge element connected to said first-mentioned circuit and to said network and having a threshold response and, above the threshold, actuated differentially by said noise pulses and said control potential for developing output pulses therefrom and for impressing said output pulses on said stripper in opposition to said noise pulses effectively to suppress the latter.

10. In a television receiver, an automatic-gain-control and synchronizing-signal separating apparatus comprising: a synchronously controlled rectifier system, including a first rectifier device having an anode and a cathode, a circuit for applying to said device a composite modulation signal including the original unidirectional component, synchronizing-signal pulses, and random noise pulses having an amplitude exceeding the peak amplitude of said synchronizing pulses, first and second integrating networks having time constants at least several times the period of said synchronizing-signal pulses and coupled between said anode and said cathode and including a point common to said networks maintained at a fixed reference potential, said first network being dynamically responsive to the cathode current of said device for deriving a first control potential normally maintaining said device in a nonconductive condition, and a gating circuit for applying to said device control pulses in coincident relation with said synchronizing pulses and with such polarity in relation thereto as to derive across said first network said first control potential and across said second network a second control potential both of which are representative of and vary dynamically with the peak amplitudes of said synchronizing pulses; synchronizing-signal stripper means coupled to said system and responsive to said first control potential and said composite signal for deriving therefrom synchronizing pulses which may include at least some of said random pulses; means including a second rectifier device coupled to said system and responsive jointly to said noise pulses and said first control potential for deriving and applying to said stripper means output pulses in opposition to said noise pulses, whereby the derived synchronizing pulses are substantially free from said random pulses; and a gain-control circuit coupled to said second network for applying said second control potential to said receiver to control the operation thereof.

No references cited.